(12) United States Patent
Mealy et al.

(10) Patent No.: US 8,614,826 B2
(45) Date of Patent: *Dec. 24, 2013

(54) POSITIONAL DATA ERROR CORRECTION

(71) Applicant: Marvell World Trade Ltd., St. Michael (BB)

(72) Inventors: James Mealy, Corvallis, OR (US); Asher Simmons, Corvallis, OR (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/690,952

(22) Filed: Nov. 30, 2012

(65) Prior Publication Data

US 2013/0088727 A1 Apr. 11, 2013

Related U.S. Application Data

(63) Continuation of application No. 12/188,107, filed on Aug. 7, 2008, now Pat. No. 8,325,379.

(60) Provisional application No. 60/954,473, filed on Aug. 7, 2007, provisional application No. 60/954,476, filed on Aug. 7, 2007.

(51) Int. Cl.
*G06F 15/00* (2006.01)
(52) U.S. Cl.
USPC .......................................................... 358/1.2
(58) Field of Classification Search
USPC .......................................................... 358/1.2
See application file for complete search history.

(56) References Cited

U.S. PATENT DOCUMENTS

| 5,825,995 | A | 10/1998 | Wiklof et al. |
| 8,325,379 | B2* | 12/2012 | Mealy et al. .................... 358/1.2 |
| 2003/0043388 | A1* | 3/2003 | Andrews et al. ................ 358/1.7 |
| 2006/0050131 | A1 | 3/2006 | Breton |
| 2006/0279784 | A1 | 12/2006 | Carlson et al. |
| 2008/0226372 | A1 | 9/2008 | Loh et al. |

FOREIGN PATENT DOCUMENTS

| EP | 1543981 A2 | 6/2005 |
| JP | 2005270484 | 10/2005 |
| JP | 2006527355 | 11/2006 |
| JP | 2007013021 | 1/2007 |
| WO | WO03076197 A1 | 9/2003 |
| WO | WO2004088576 A1 | 10/2004 |

* cited by examiner

*Primary Examiner* — Saeid Ebrahimi Dehkordy

(57) ABSTRACT

Systems, apparatuses, and methods for correcting systematic errors in positional data of electronic devices configured to navigate across a surface. An apparatus configured to correct positional errors may comprise one or more navigation sensors, and a position module configured to control the one or more navigation sensors to capture a plurality of navigational measurements and adjust the navigational measurements by one or more scaling factors to determine a translation path of the apparatus over a medium. The one or more scaling factors may be constructed by capturing a plurality of navigational measurements to determine a detected translation path of an apparatus, comparing an actual translation path of the apparatus to the detected translation path of the apparatus, and generating the one or more scaling factors based at least in part on a difference between the actual translation path and the detected translation path. Other embodiments also are described.

21 Claims, 5 Drawing Sheets

POSITIONAL DATA ERROR CORRECTION

CROSS-REFERENCE TO RELATED APPLICATIONS

The present disclosure is a continuation of and claims priority to U.S. application Ser. No. 12/188,107, filed Aug. 7, 2008, entitled "Positional Data Error Correction," now U.S. Pat. No. 8,325,379, issued Dec. 4, 2012, which claims priority to U.S. Provisional Patent Application Nos. 60/954,473, entitled "A General Method for Correcting Systematic Errors in Discrete Measurement Systems," and 60/954,476, entitled "Method for Eliminating Motion Induced Offsets in a Non-Rectilinear Printer," both filed Aug. 7, 2007, which are incorporated herein by reference.

TECHNICAL FIELD

Embodiments of the present invention relate to the field of position detection and, more particularly, to correcting systematic errors in positional data of electronic devices configured to navigate across a surface.

BACKGROUND

Traditional printing devices rely on a mechanically operated carriage to transport a print head in a linear direction as other mechanics advance a medium in an orthogonal direction. As the print head moves over the medium an image may be laid down. Portable printers have been developed through technologies that reduce the size of the operating mechanics. However, the principles of providing relative movement between the print head and medium remain the same as traditional printing devices. Accordingly, these mechanics limit the reduction of size of the printer as well as the material that may be used as the medium.

Handheld printing devices have been developed that allow an operator to manipulate a handheld device over a medium in order to print an image onto the medium. However, these devices are challenged by the unpredictable and nonlinear movement of the device by the operator. The variations of operator movement, including rotation of the device itself, make it difficult to determine the precise location of the print head. This type of positioning error may have deleterious effects of the quality of the printed image.

Certain handheld scanners have been developed for acquiring an image from a target media. During a scan, image data is recorded by image sensors along with positioning data by positioning sensors, which bracket the image sensors. The accumulated image data is position-tagged and recorded as distorted image data. Once the distorted image data has been acquired, it will be processed to provide a rectified image that corrects for rotational distortions. This rectification process further relies on overlapping regions of acquired image data to facilitate the stitching of the final image.

While this process may work in a scanning scenario, a printing scenario presents other challenges. For example, in a printing operation the positioning of a handheld printing device may not be postponed until after a medium has been fully scanned. Furthermore, stitching of a captured image may also not be available.

SUMMARY OF THE INVENTION

In view of the problems in the state of the art, embodiments of the invention are directed to correcting systematic errors in positional data of electronic devices configured to navigate across a surface. More specifically, there is provided, in accordance with various embodiments of the present invention, a method comprising capturing a plurality of navigational measurements to determine a detected translation path of an apparatus, comparing an actual translation path of the apparatus to the detected translation path of the apparatus, generating one or more scaling factors based at least in part on a difference between the actual translation path and the detected translation path, and creating a lookup table including the one or more scaling factors.

In some embodiments, the method may further comprise accumulating incremental translational changes between successive navigational measurements of the plurality of navigational measurements, wherein the incremental translational changes comprise changes in one or more coordinate values. The one or more scaling factors may be adjusted based at least in part on a frequency of a subset of coordinate values occurring among the plurality of coordinate values.

In some embodiments, a value of the one or more scaling factors may be generated based at least in part on a velocity of the apparatus. In some embodiments, a value of the one or more scaling factors may be generated based at least in part on an acceleration of the apparatus.

In some embodiments, a cerebellar model articulation controller (CMAC) neural network may be used for adjusting the one or more scaling factors.

In various embodiments, an apparatus may comprise one or more navigation sensors, and a position module configured to control the one or more navigation sensors to capture a plurality of navigational measurements and adjust the navigational measurements by one or more scaling factors to determine a translation path of the apparatus over a medium.

In some embodiments, the position module may be configured to accumulate incremental translational changes between successive navigational measurements of the plurality of navigational measurements. The incremental translational changes may comprise changes in one or more coordinate values. In various embodiments, the position module may be configured to adjust the one or more scaling factors based at least in part on a frequency of a subset of coordinate values occurring among the plurality of coordinate values.

In some embodiments, the value of the one or more scaling factors may be based at least in part on a velocity of the apparatus. In some embodiments, the value of the one or more scaling factors may be based at least in part on an acceleration of the apparatus.

In some embodiments, the apparatus may comprise a communication interface configured to receive an image from an image source, and a print module configured to cause a printing substance to be deposited on the medium based at least in part on the image and the determined translation path of the apparatus.

Another method is also provided. In various embodiments, the method may comprise capturing a plurality of navigational measurements, adjusting the navigational measurements by one or more scaling factors, and determining a translation path of an apparatus over a medium based at least in part on the adjusted navigational measurements.

In some embodiments, incremental translational changes between successive navigational measurements of the plurality of navigational measurements may be accumulated. The incremental translational changes may comprise changes in a coordinate value.

In some embodiments, the one or more scaling factors may be adjusted based at least in part on a frequency of a subset of coordinate values occurring among the plurality of coordinate values. In some embodiments, the one or more scaling factors may be adjusted based at least in part on a velocity of the apparatus. In some embodiments, the one or more scaling factors may be adjusted based at least in part on an acceleration of the apparatus.

In some embodiments, the method may comprise receiving an image from an image source, and depositing a printing substance on the medium based at least in part on the image and the determined translation path of the apparatus.

A machine-accessible medium having associated instructions is also disclosed in accordance with embodiments of the present invention. The associated instructions, when executed, may result in an apparatus capturing a plurality of navigational measurements, adjusting the navigational measurements by one or more scaling factors, and determining a translation path of an apparatus over a medium based at least in part on the adjusted navigational measurements.

In some embodiments, the associated instructions, when executed, may result in the apparatus adjusting the one or more scaling factors based at least in part on a frequency of a subset of coordinate values occurring among the plurality of coordinate values of the translation path. In some embodiments, the associated instructions, when executed, may result in the apparatus adjusting the one or more scaling factors based at least in part on a velocity of the apparatus. In some embodiments, the associated instructions, when executed, may result in the apparatus adjusting the one or more scaling factors based at least in part on an acceleration of the apparatus.

In some embodiments, the associated instructions, when executed, may result in the apparatus receiving an image from an image source, and depositing a printing substance on the medium based at least in part on the image and the determined translation path of the apparatus.

Another apparatus is disclosed in accordance with further embodiments. The apparatus may comprise means for capturing a plurality of navigational measurements, means for adjusting the navigational measurements by one or more scaling factors, and means for determining a translation path of an apparatus over a medium based at least in part on the adjusted navigational measurements.

The apparatus may further comprise means for adjusting the one or more scaling factors based at least in part on a frequency of a subset of coordinate values occurring among the plurality of coordinate values of the translation path.

The apparatus may further comprise means for adjusting the navigational measurements by one or more scaling factors based at least in part on a selected one of velocity and acceleration of the apparatus.

Other features that are considered as characteristic for embodiments of the invention are set forth in the appended claims.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use the phrases "in an embodiment," "in embodiments," or "in various embodiments," which may each refer to one or more of the same or different embodiments. Furthermore, the terms "comprising," "including," "having," and the like, as used with respect to embodiments of the present invention, are synonymous. The phrase "A/B" means A or B. For the purposes of the present invention, the phrase "A and/or B" means "(A), (B), or (A and B)." The phrase "at least one of A, B, and C" means "(A), (B), (C), (A and B), (A and C), (B and C), or (A, B, and C)." The phrase "(A)B" means "(B) or (AB)," that is, A is an optional element.

Figure 1:
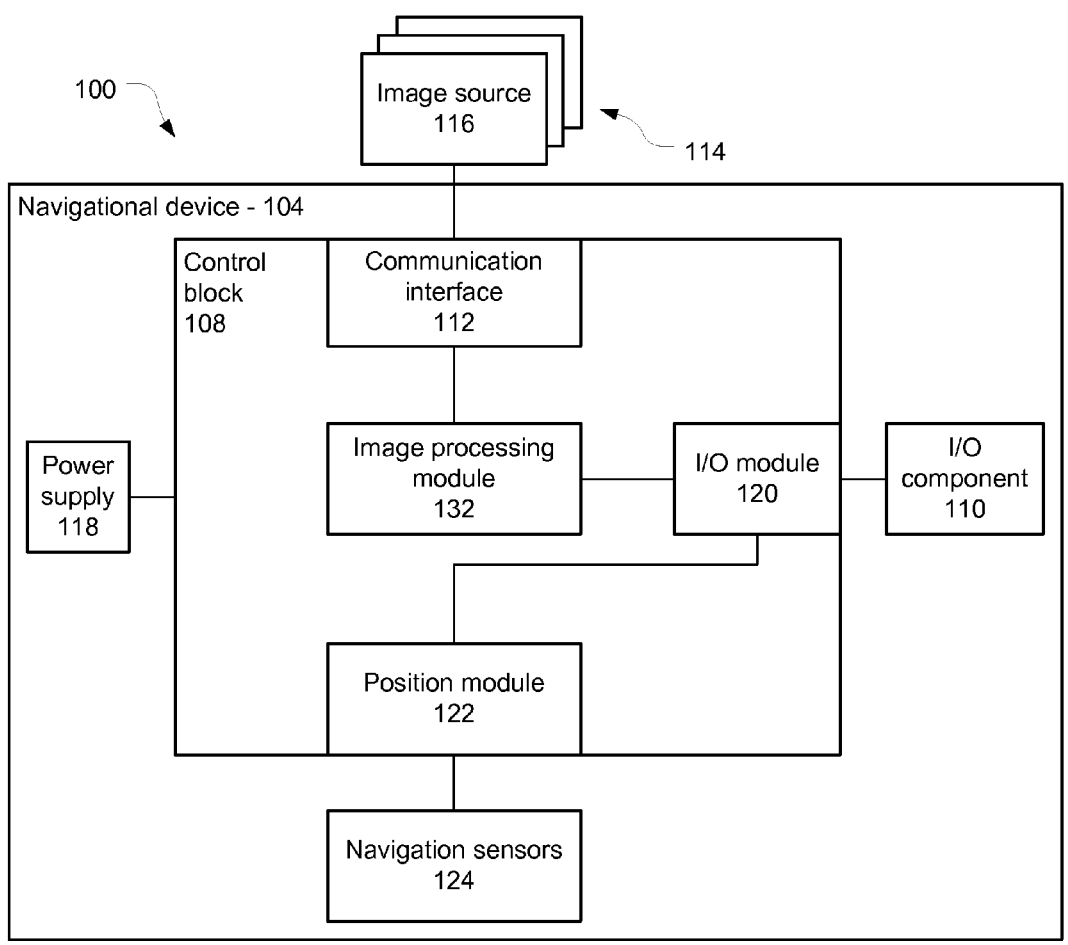
FIG. 1 is a schematic of a system including a navigational device in accordance with various embodiments of the present invention.

FIG. 1 is a schematic of a system 100 including a navigational device 104 in accordance with various embodiments of the present invention. The navigational device 104 may include a control block 108 with components designed to facilitate precise and accurate positioning of one or more input/output (I/O) components 110 throughout an entire navigation operation. As used herein, "I/O" may refer to input only, output only, or input and output capability.

In various embodiments, the navigational device 104 may be any input and/or output electronic device adapted to navigate over a surface. For example, the navigational device 104 may be a mouse or an image translation device. An image translation device may be any device adapted to print and/or scan, and in various embodiments, an image translation device may be a hand-held image translation device. This positioning may allow the navigational device 104 to reliably translate an image in a truly mobile and versatile platform as will be explained herein.

Image translation, as used herein, may refer to a translation of an image that exists in a particular context (e.g., a medium) into an image in another context. For example, an image translation operation may be a scan operation. In this situation, a target image, e.g., an image that exists on a tangible medium, is scanned by the navigational device 104 and an acquired image that corresponds to the target image is created and stored in memory of the navigational device 104. For another example, an image translation operation may be a print operation. In this situation, an acquired image, e.g., an image as it exists in memory of the navigational device 104, may be printed onto a medium.

The control block 108 may include a communication interface 112 configured to communicatively couple the control block 108 to another device such as, for example, an image transfer device 114 including one or more image sources 116. In various embodiments, the communication interface 112 may be configured to communicatively couple the control block 108 to a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the communication interface 112 is configured to communicatively couple the control block 108 to a removable storage device, e.g., a universal serial bus (USB) storage device, the communication interface 112 may be coupled to a port, e.g., USB port, of the navigational device 104 designed to receive the storage device.

The communication interface 112 may include a wireless transceiver to allow the communicative coupling with another device to take place over a wireless link. Data may be wirelessly transmitted over the link through the modulation of electromagnetic waves with frequencies in the radio, infrared or microwave spectrums.

A wireless link may contribute to the mobility and versatility of the navigational device 104. However, some embodiments may additionally/alternatively include a wired link communicatively coupling other devices to the communication interface 112.

In some embodiments, the communication interface 112 may communicate with other devices through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

The navigational device 104 may include a power supply 118 coupled to the control block 108. The power supply 118 may be a mobile power supply, e.g., a battery, a rechargeable battery, a solar power source, etc. In other embodiments, the power supply 118 may additionally/alternatively regulate power provided by another component (e.g., a device communicatively coupled to communication interface 112, a power cord coupled to an alternating current (AC) outlet, etc.).

An I/O module 120, which may be configured to control the I/O components 110, may receive positioning information indicative of a position of a print head of the I/O components 110 relative to a reference location from a position module 122. The position module 122 may control one or more navigation sensors 124 to capture navigational measurements to track incremental movement of the navigational device 104 relative to the reference location.

In some embodiments, the navigational measurements may be navigational images of a medium adjacent to the navigational device 104. In these embodiments, the navigation sensors 124 may include one or more imaging navigation sensors. An imaging navigation sensor may include a light source, e.g., light-emitting diode (LED), a laser, etc., and an optoelectronic sensor designed to capture a series of navigational images of an adjacent medium as the navigational device 104 is moved over the medium.

The position module 122 may process the navigational images to detect structural variations of the medium. The movement of the structural variations in successive images may indicate motion of the navigational device 104 relative to the medium. Tracking this relative movement may facilitate determination of the precise positioning of the navigation sensors 124. The navigation sensors 124 may be maintained in a structurally rigid relationship with the I/O components 110, thereby allowing for the calculation of the precise location of the I/O components 110.

In other embodiments, non-imaging navigation sensors, e.g., an accelerometer, a gyroscope, a pressure sensor, etc., may be additionally/alternatively used to capture navigational measurements.

The navigation sensors 124 may have operating characteristics sufficient to track movement of the navigational device 104 with the desired degree of precision. In one example, imaging navigation sensors may process approximately 2000 frames per second, with each frame including a rectangular array of 30×30 pixels. Each pixel may detect a six-bit grayscale value, e.g., capable of sensing 64 different levels of patterning.

Referring again to FIG. 1, the navigational device 104 may be, as noted herein, an image translation device. In these embodiments, the control block 108 may include components designed to facilitate precise and accurate positioning of input/output (I/O) components 110 throughout an entire navigation operation.

When the image translation operation includes a print operation, the communication interface 112 may receive image data from the image transfer device 114 and transmit the received image data to an on-board image processing module 132. The image processing module 132 may process the received image data in a manner to facilitate an upcoming printing process. Image processing techniques may include dithering, decompression, half-toning, color plane separation, and/or image storage. In various embodiments some or all of these image processing operations may be performed by the image transfer device 114 or another device. The processed image may then be transmitted to the I/O component 110, which may function as a print module in this embodiment, where it is cached in anticipation of the print operation.

The I/O module 120, which may be configured to control the I/O components 110, may receive positioning information indicative of a position of a print head of the I/O components 110 of relative to a reference location from a position module 122. The position module 122 may control one or more navigation sensors 124 to capture navigational measurements to track incremental movement of the image translation device 104 relative to the reference location. The positioning information may be corrected according to methods described herein.

Once the I/O module 120 receives the positioning information it may coordinate the location of the print head to a portion of the processed image with a corresponding location. The print module may then control the print head in a manner to deposit a printing substance on the medium adjacent to the image translation device 104 to represent the corresponding portion of the processed image.

The print head may be an inkjet print head having a plurality of nozzles designed to emit liquid ink droplets. The ink, which may be contained in reservoirs or cartridges, may be black and/or any of a number of various colors. A common, full-color inkjet print head may have nozzles for cyan, magenta, yellow, and black ink. Other embodiments may utilize other printing techniques, e.g., toner-based printers such as laser or LED printers, solid ink printers, dye-sublimation printers, inkless printers, etc.

In an embodiment in which an image translation operation includes a scanning operation, the I/O module 120 may function as an image capture module and may be communicatively coupled to one or more optical imaging sensors of the I/O components 110. Optical imaging sensors, which may include a number of individual sensor elements, may be designed to capture a plurality of surface images of a medium adjacent to the image translation device 104. The surface images may be individually referred to as component surface images. The I/O module 120 may generate a composite image by stitching together the component surface images. The I/O module 120 may receive positioning information from the position module 122 to facilitate the arrangement of the component surface images into the composite image.

Relative to the imaging navigation sensors, the optical imaging sensors may have a higher resolution, smaller pixel size, and/or higher light requirements. While the imaging navigation sensors are configured to capture details about the structure of the underlying medium, the optical imaging sensors may be configured to capture an image of the surface of the medium itself.

In an embodiment in which the image translation device 104 is capable of scanning full color images, the optical imaging sensors may have sensor elements designed to scan different colors.

A composite image acquired by the image translation device 104 may be subsequently transmitted to the image transfer device 114 by, e.g., e-mail, fax, file transfer protocols, etc. The composite image may be additionally/alternatively stored locally by the image translation device 104 for subsequent review, transmittal, printing, etc.

In addition (or as an alternative) to composite image acquisition, an image capture module may be utilized for calibrating the position module 122. In various embodiments, the component surface images (whether individually or collectively as the composite image) may be compared to the processed print image rendered by the image processing module 132 to correct for accumulated positioning errors and/or to reorient the position module 122 in the event the position module 122 loses track of its reference point. This may occur, for example, if the image translation device 104 is removed from the medium during an image translation operation.

Referring again to the navigation sensors 124, although it would be ideal for the navigation sensors 124 to provide error-free data regarding the translation path of navigational device 104, it may sometimes be the case that data provided by the navigation sensors 124 is discovered to be inaccurate relative to the actual translation path of the navigational device 104 (i.e., the detected translation path of the navigational device 104 differs from its actual translation path).

Figure 2A:
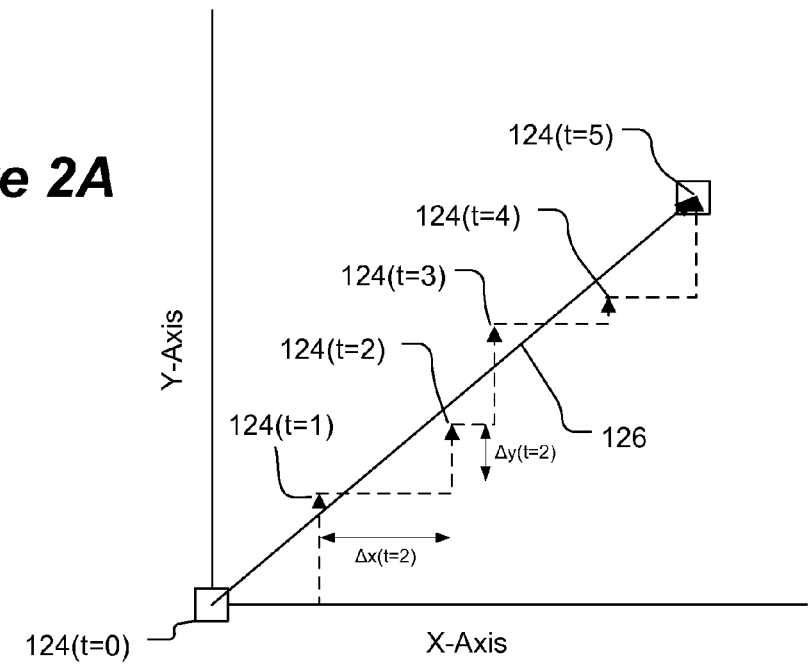
FIG. 2A and FIG. 2B are graphic depictions of a positioning operation of a navigational device in accordance with various embodiments of the present invention.
Figure 2B:
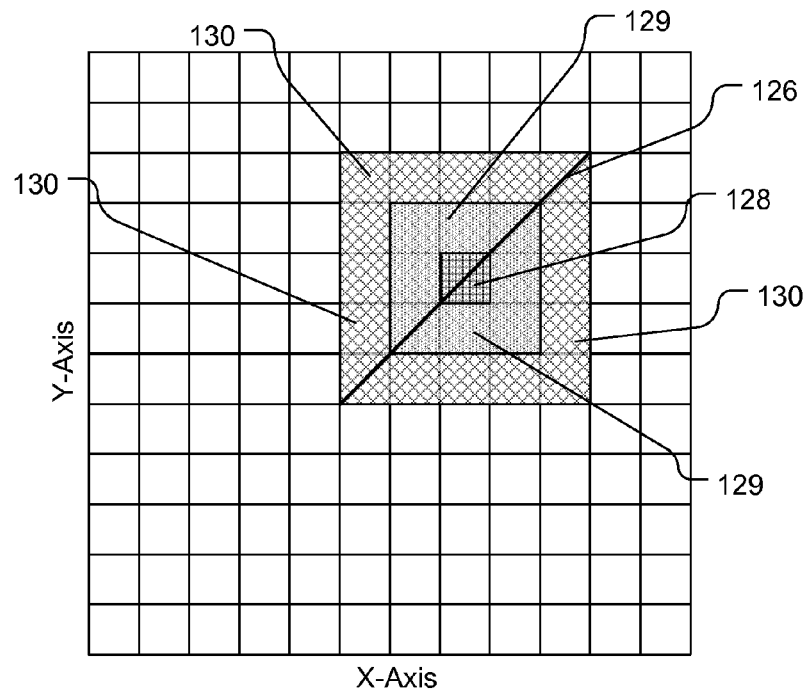

FIG. 2A and FIG. 2B are graphical depictions of position-correction operations of the navigational device 104 in accordance with embodiments of the present invention. At initiation, e.g., t=0, the navigation sensors 124 may be in an initial position indicated by 124($t$=0). Over successive time intervals, e.g., t=1-5, the navigation sensors 124 may be moved to an end position indicated by 124($t$=5). As used in description of this embodiment, the "initial position" and the "end position" are used merely with reference to this particular operation and not necessarily the start or end of the navigation operation or even other positioning operations.

As the navigational device 100 is moved, the navigation sensors 124 may capture navigational measurements at each of the indicated time intervals, e.g., t=0-5. It is noted that although the translation path of the navigational device 104 is depicted as a single line of motion 126 (also referred to herein as a translation path), in various embodiments the navigational measurements may comprises a plurality of lines of motion (e.g., if the navigational device 104 includes a plurality of navigation sensors configured to capture distinct lines of motion). In various ones of these embodiments, the capture period may be synchronized between the navigation sensors 124 by, e.g., hardwiring together the capture signals transmitted from the position module 122. The capture periods may vary and may be determined based on set time periods, detected motion, or some other trigger. In some embodiments, each of the navigation sensors 124 may have different capture periods that may or may not be based on different triggers.

The translation of the navigation sensors 124 may be determined within the context of a world-space (w-s) coordinate system, e.g., a Cartesian coordinate system. In particular, the translation values may be determined for two-dimensions of the w-s coordinate system, e.g., the x-axis and the y-axis as illustrated in FIG. 2A and FIG. 2B. For example, the position module 122 may accumulate the incremental $\Delta x$'s and $\Delta y$'s between successive time periods in order to determine the total translation of the navigation sensors 124 from time 0 to time 5.

As illustrated in FIG. 2A, the actual line of motion 126 (i.e., the actual translation path) of the navigational device 100 does not exactly match up with positions measured by the navigation sensors 124 after each time interval (i.e., the detected translation path). At t=1, for example, the $\Delta x$, $\Delta y$ values measure the location of the navigational device 104 at slightly above the actual line of motion 126, and at t=2, slightly below. In the illustrated depiction, the measured values deviate from the actual line of motion 126 and vary with respect to the angle of the movement. Unfortunately, the direct cause of such errors in translation path data may be unknown, or if known, may be impractical or impossible to correct.

For determining the actual translation path, any measurement system may be suitable. In general, the navigational device 100 may be moved in known increment(s) for setting the actual translation path. In some embodiments using the Cartesian coordinate system, for example, the actual translation path of the navigational device 100 may be determined using a Cartesian robotic system or the like, wherein the navigational device 100 may be moved in known x,y increments with high degree of accuracy (e.g., within ten micrometers). In some embodiments, the actual translation path may also include data on the velocity and/or acceleration of the movement. Accordingly, the actual translation path may be determined irrespective of the translation detected by the navigation sensors 124.

In various embodiments, to correct for one or more systematic errors in translation path data, the position module 122 may be configured to adjust the navigational measurements by one or more scaling factors to determine an actual translation path of the navigational device 104 over a medium. To that end, a lookup table (LUT) may be constructed for each of navigation sensors 124. To look up a value in the LUT, the measured $\Delta x$, $\Delta y$ may be used to address the table, and the value delivered (scaling factor) may be multiplied by the $\Delta x$, $\Delta y$ to produce a scaled data. The scaled data may more closely match the actual line of motion 126.

For lines of motion comprising one or only a few $\Delta x$, $\Delta y$ pairs, the scaled data may substantially match the actual line of motion 126. For longer translation paths comprising more than one or a few $\Delta x$, $\Delta y$ pairs of the LUT, however, there may be certain $\Delta x$, $\Delta y$ pairs that contribute more than others in scaling the composite line; that is, some subset of $\Delta x$, $\Delta y$ pairs occurring in line of motion 126 may be more frequent than others. FIG. 2B generally represents a histographic depiction of this frequency difference, wherein $\Delta x$, $\Delta y$ pairs 128 toward the center of the line of motion 126 may occur more frequently than $\Delta x$, $\Delta y$ pairs 129, which occur more frequency than Δx, Δy pairs 130 toward the ends of the line of motion 126. As illustrated, this histographic information is represented generally as concentric squares. When looking up values in the LUT for the full line of motion 126, the Δx, Δy pairs of 124(*t*=3) may occur more frequently than the Δx, Δy pairs of 124(*t*=1) and 124(*t*=5). Accordingly, it may be desirable to reduce the scaling factor of the Δx, Δy pairs of 124 (*t*=3) because of its overall contribution to the scaling of the composite line.

In some cases, translational errors may be attributable to dynamic considerations such as, for example, velocity and acceleration. Accordingly, in various embodiments the dynamics of velocity and/or acceleration of the line of motion 126 of the navigational device 104 may be taken into account. One or both of these dynamic considerations may simply be reflected in the LUT including the Δx and Δy values.

In terms of velocity, regular sampling of Δx, Δy pairs, at determinate intervals, would provide a real velocity value (where velocity=distance/time), but it may be more realistic that sampling is performed indeterminately and so may not support an accurate notion of velocity.

For accounting for sampling performed on an indeterminate interval, a velocity value normalized over the expectable range of the navigational device 104 may be used. The normalized velocity may be determined according to the following equation:

$$V = \frac{D}{R},$$

where V is the normalized velocity, D is the change in location, and R is the velocity range.

Acceleration be represented as a relative change in velocity from the last sample (i.e., after the last interval). Accordingly, the acceleration may be determined according to the following equation:

$$A = \frac{D_n - D_m}{R},$$

where A is the normalized acceleration, $D_n$-$D_m$ is the change in location relative to the last sample an interval from t=m to t=n (e.g., change in location from a sample taken at t=3 to a sample take at t=4), and R is the acceleration range.

As noted herein, one or both of these dynamic considerations may simply be reflected in the LUT including the Δx and Δy values. In some embodiments, however, the addition of dimensions to a LUT may be impractical in terms of memory usage. For example, if a two-dimensional (i.e., Δx and Δy) LUT for a navigation sensor uses 64 kilobits (Kb) at a resolution of 256 bits per dimension, increasing by another dimension to three dimensions total would require 16 megabits (Mb), and up to 4 gigabits (Gb) for four dimensions total. Moreover, increasing the number of dimensions provided in the LUT may also necessitate an increased number of data samples for building the LUT itself.

Various training techniques may be used for minimizing the impact of multi-dimensional LUTs. In some embodiments, a neural network-type training algorithm may be used for producing a smaller LUT that can be sufficiently trained with a subset of the input domain. In some embodiments, for example, a cerebellar model articulation controller (CMAC) neural network model may be used for breaking the single LUT into a series of overlapping multi-dimensional tables of lower resolution. Accordingly, using a four dimensional CMAC with an input resolution of 256 bits and a generalization of 16 bits would require 1 Mb of memory as opposed to 4 Mb. In some embodiments using the CMAC training methodology, the input space may be hashed to reduce the memory requirements, if applicable.

For constructing the LUT with the scaling factors associated with the various input values (e.g., Δx, Δy, velocity, acceleration), position data may be collected synchronously with the sampling of the Δx and Δy values for some set of data samples. In order to reduce the effects of quantization, as discussed more fully herein with respect to FIG. 2A and FIG. 2B, the measured translation path may be compared to the actual translation path for each sample and the scaling factors of the LUT may be adjusted accordingly. The operation may be repeated for the sample set one or more times in order to smooth out the quantization effects. In some embodiments, upon each repetition, the span of values may be shifted ahead one sample on the actual translation path.

Figure 3:
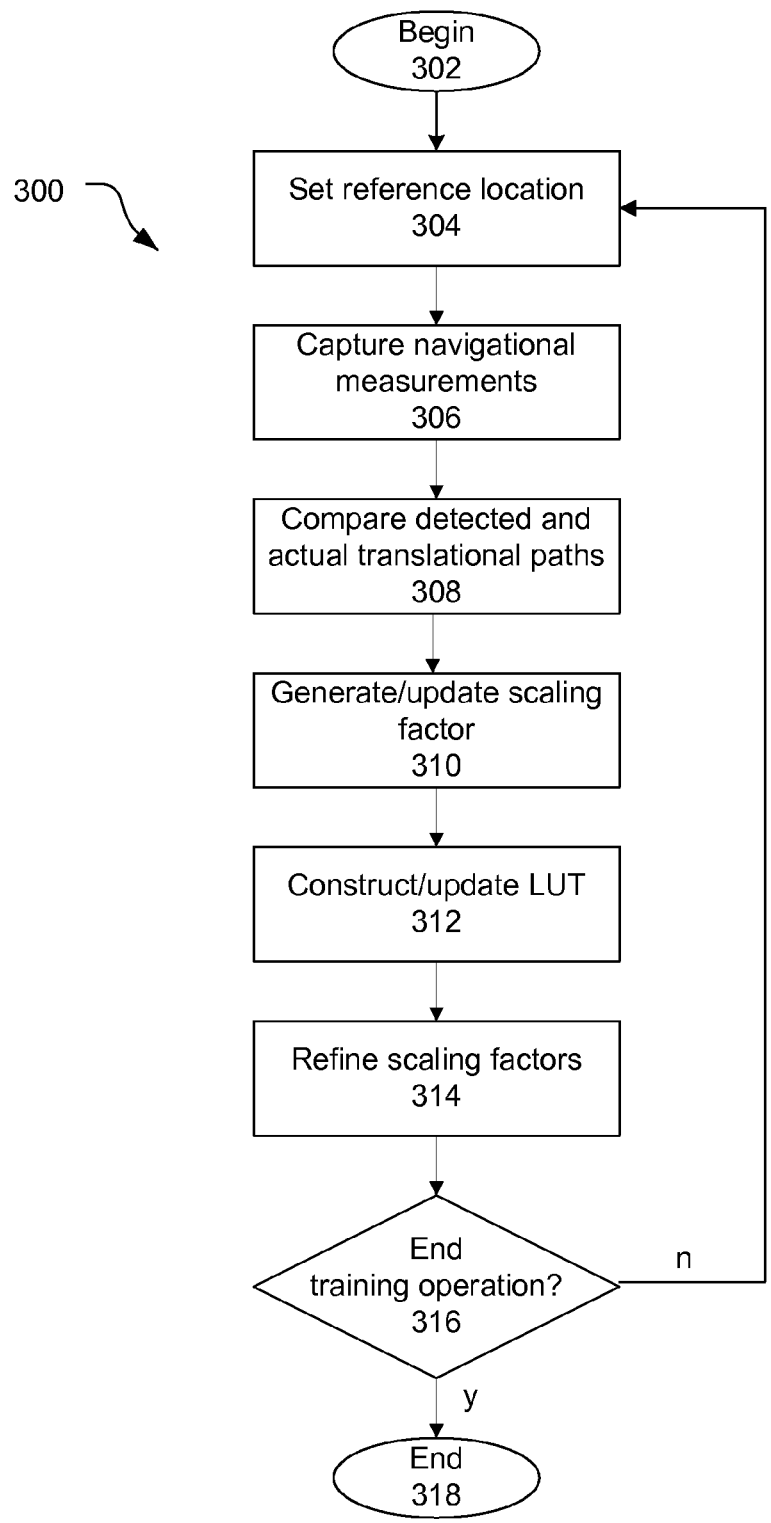
FIG. 3 is a flow diagram depicting a position training operation of a navigational device in accordance with various embodiments of the present invention.

FIG. 3 is a flow diagram 300 depicting a training operation of the navigational system 100 in accordance with various embodiments of the present invention. The training operation may train the navigational system 100 to correct positional errors occurring after the training. A training operation may begin at block 302 with an initiation of the training operation, e.g., by activation of the navigational device 104. A position module 122 of the navigational device 104 may set a reference location at block 304. The reference location may be set when the navigational device 104 is placed onto a medium at the beginning of a navigation operation.

Once the reference location is set at block 304, the navigation sensors 124 may capture navigational measurements at block 306 to determine a detected translation path of the navigational device 104.

The position module 122 may determine positioning information, e.g., translational changes from the reference location, using the navigation sensors 124. The position module 122 may determine positioning information by accumulating incremental translational changes between successive navigational measurements of a plurality of navigational measurements.

The position module may compare the detected translation path to the actual translation path of the navigational device 104 at block 308, and may then generate or update, at block 310, one or more scaling factors based at least in part on a difference between the actual translation path and the detected translation path. The one or more scaling factors may be generated or updated based at least in part on a velocity and/or acceleration of the navigational device 104.

The generated/updated scaling factors may then be used for constructing or updating a LUT at block 312.

As described herein, scaling of a detected translation path may be affected by quantization of one or more measured values (e.g., Δx, Δy, velocity, acceleration) contributing more than others to the composite translation path. In these embodiments, a refinement of the measured values may be performed at block 314. Accordingly, the position module 122 may adjust the one or more scaling factors based at least in part on a frequency of a subset of measured values occurring among the plurality of measured values. In some embodiments, the navigational device 104 may be configured to use a CMAC neural network training methodology to adjust the one or more scaling factors.

The training operation may advance to block 316 to determine whether the end of the training has been reached, and if so, the training is ended at block 318. If it is determined that additional training is desired, another reference location may be set at block 304, further navigational measurements may be captured at block 306, and so on. In some embodiments, the method may proceed directly to capturing navigational measurements at block 306 rather than setting another reference location first.

Figure 4:
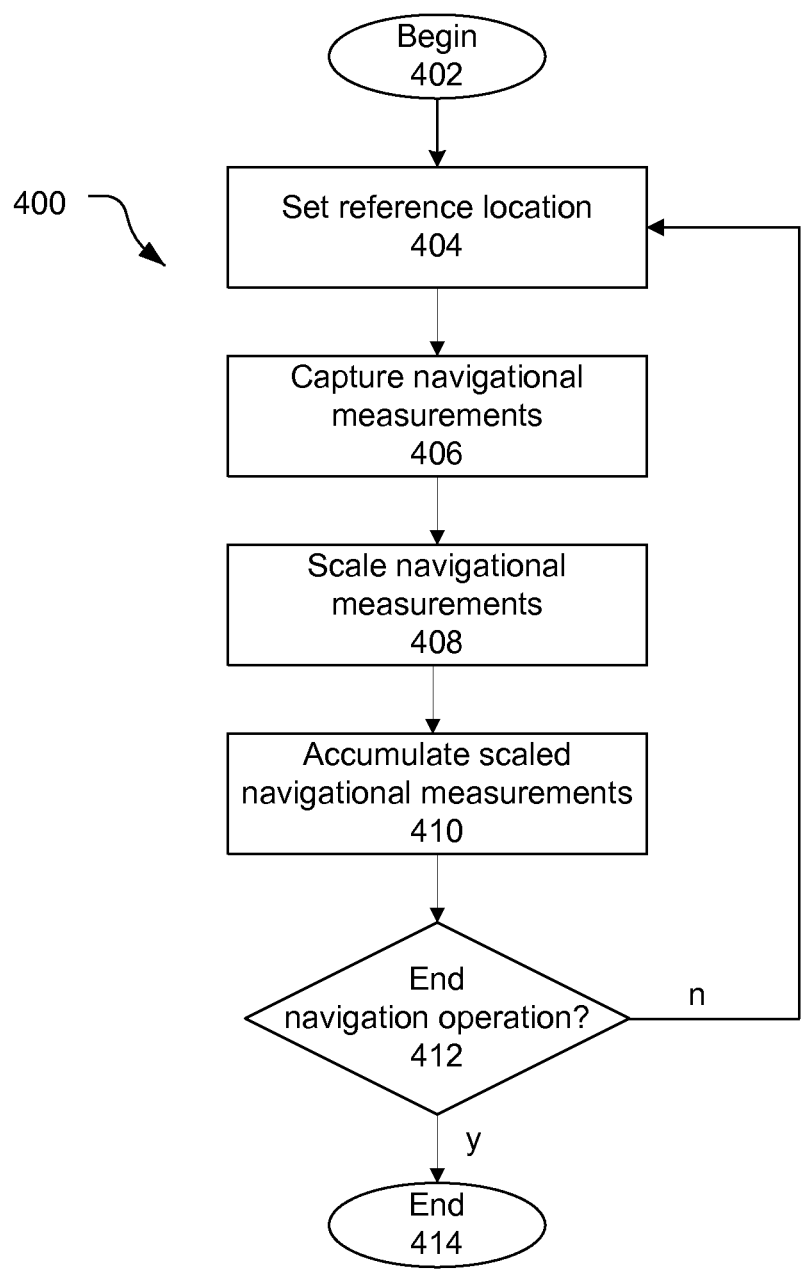
FIG. 4 is a flow diagram depicting a navigation operation of a navigational device in accordance with various embodiments of the present invention.

FIG. 4 is a flow diagram 400 depicting a positioning operation of the navigational system 100 in accordance with various embodiments of the present invention. A navigation operation may comprise any operation in which navigational device 104 navigates over a surface. For example, the navigational device 104 may be a mouse or an image translation device. An image translation device may be any device adapted to print and/or scan, and in various embodiments, an image translation device may be a hand-held image translation device.

The navigation operation may begin at block 402 with an initiation of a navigation operation, e.g., by activation of the navigational device 104. A position module within the navigational device 104 may set a reference location at block 404. The reference location may be set when the navigational device 104 is placed onto a medium at the beginning of a navigation operation.

Once the reference location is set at block 404, the navigation sensors 124 may capture navigational measurements at block 406 to determine a detected translation path of the navigational device 104.

As the navigational device 104 traverses the medium, the navigational measurements may be adjusted by the position module 122 by one or more scaling factors at block 408 to determine a translation path of an apparatus over a medium based at least in part on the adjusted navigational measurements. The navigational device 104 may include a LUT including the scaling factors that may have been previously-generated by a training operation such as, for example, the training operation described herein with reference to FIG. 4.

Scaled navigational measurements may be accumulated at block 410 to track the location and translation path of the navigational device 104.

The navigation operation may advance to block 412 to determine whether the end of the navigation has been reached, and if so, the navigation is ended at block 414. If it is determined that additional training is desired, another reference location may be set at block 404, further navigational measurements may be captured at block 406, and so on. In some embodiments, the method may proceed directly to capturing navigational measurements at block 306 rather than setting another reference location first.

Figure 5:
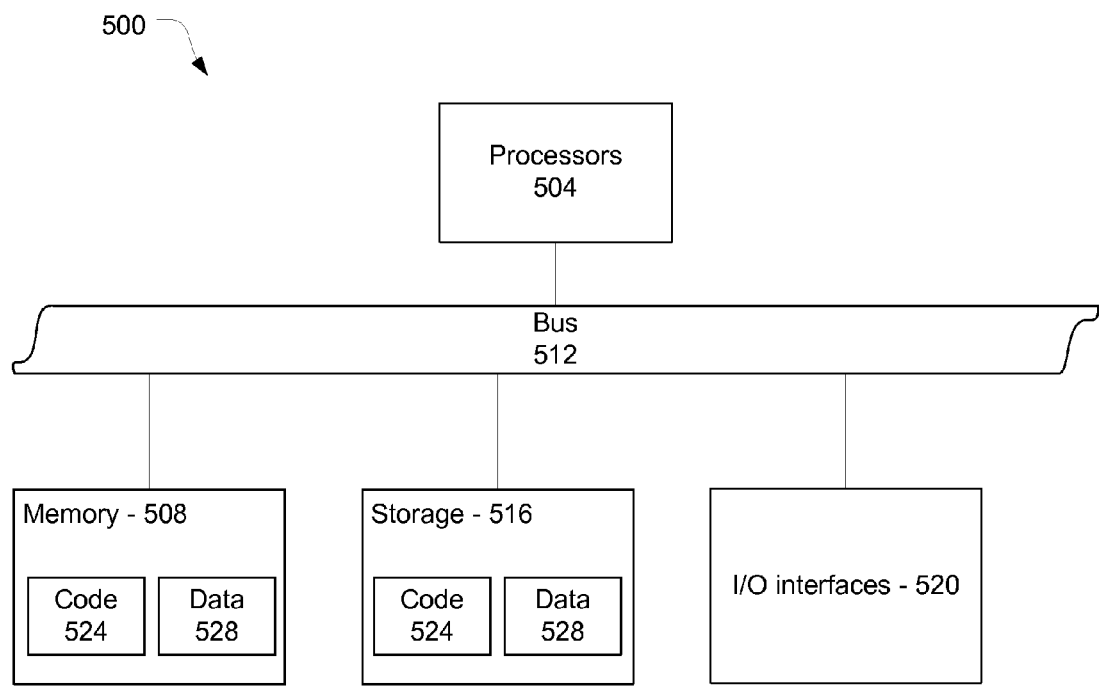
FIG. 5 illustrates a computing device capable of implementing a control block of a navigational device in accordance with various embodiments of the present invention.

FIG. 5 illustrates a computing device 500 capable of implementing a control block, e.g., control block 108, in accordance with various embodiments. As illustrated, for the embodiments, computing device 500 includes one or more processors 504, memory 508, and bus 512, coupled to each other as shown. Additionally, computing device 500 includes storage 516, and one or more input/output interfaces 520 coupled to each other, and the earlier described elements as shown. The components of the computing device 500 may be designed to provide the printing and/or positioning functions of a control block of an IT device as described herein.

Memory 508 and storage 516 may include, in particular, temporal and persistent copies of code 524 and data 528, respectively. The code 524 may include instructions that when accessed by the processors 504 result in the computing device 500 performing operations as described in conjunction with various modules of the control block in accordance with embodiments of this invention. The processing data 528 may include data to be acted upon by the instructions of the code 524. In particular, the accessing of the code 524 and data 528 by the processors 504 may facilitate printing and/or positioning operations as described herein.

The processors 504 may include one or more single-core processors, multiple-core processors, controllers, application-specific integrated circuits (ASICs), etc.

The memory 508 may include random access memory (RAM), dynamic RAM (DRAM), static RAM (SRAM), synchronous DRAM (SDRAM), dual-data rate RAM (DDRRAM), etc.

The storage 516 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 516 may be a storage resource physically part of the computing device 500 or it may be accessible by, but not necessarily a part of, the computing device 500. For example, the storage 516 may be accessed by the computing device 500 over a network.

The I/O interfaces 520 may include interfaces designed to communicate with peripheral hardware, e.g., I/O components 112, navigation sensors 124, etc., and/or remote devices, e.g., image transfer device 520.

In various embodiments, computing device 500 may have more or less elements and/or different architectures.

While embodiments of the present invention discuss tracking an IT device in a two-dimensional coordinate system, other embodiments may include tracking within a three-dimensional coordinate system.

Although certain embodiments have been illustrated and described herein for purposes of description of a preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
 while moving a device over a medium,
  performing a first measurement of a path of the device over the medium,
  obtaining a measurement of the device relative to a reference, and
  based on the measurement of the device relative to the reference, performing a second measurement of the path of the device over the medium,
 performing a comparison of (i) the first measurement of the path of the device over the medium to (ii) the second measurement of the path of the device over the medium;
 based upon the comparison, generating a scaling factor, wherein the scaling factor is based at least in part on a difference between (i) the first measurement of the path of the device over the medium and (ii) the second measurement of the path of the device over the medium; and
 creating a lookup table including the scaling factor, wherein the scaling factor in the lookup table is usable by the device to adjust a subsequent measurement of the device relative to the reference.

2. The method of claim 1, wherein a value of the scaling factor is generated based at least in part on a velocity at which the device is being moved over the medium.

3. The method of claim 1, wherein a value of the scaling factor is generated based at least in part on an acceleration of the device as the device is being moved over the medium.

4. The method of claim 1, further comprising using a cerebellar model articulation controller (CMAC) neural network to adjust the scaling factor.

5. The method of claim 1, wherein:
the first measurement of the path of the device over the medium is based on an actual path of travel of the device; and
the second measurement of the path of the device over the medium is based on a path of travel of the device over the medium as detected in relation to the reference.

6. The method of claim 1, wherein the reference comprises a reference location on the medium.

7. A device comprising:
a navigation sensor; and
a position module configured to, while moving the device over a medium
perform a first measurement of a path of the device over the medium,
control the navigation sensor to obtain a measurement of the device relative to a reference,
based upon the measurement of the device relative to the reference, perform a second measurement of the path of the device over the medium,
perform a comparison of (i) the first measurement of the path of the device over the medium to (ii) the second measurement of the path of the device over the medium,
based at least in part on the comparison of (i) the first measurement of the path of the device over the medium to (ii) the second measurement of the path of the device over the medium, generate a scaling factor, and
create a lookup table including the scaling factor, wherein the scaling factor in the lookup table is usable by the device to adjust a subsequent measurement, obtained by the navigation sensor, of the device relative to the reference.

8. The device of claim 7, wherein the position module is configured to accumulate incremental translational changes between successive measurements of the device relative to the reference.

9. The device of claim 8, wherein the incremental translational changes comprise changes in one or more coordinate values.

10. The device of claim 9, wherein the position module is configured to adjust the scaling factor based at least in part on a frequency of a subset of coordinate values occurring among a plurality of coordinate values.

11. The device of claim 7, wherein a value of the scaling factor is based at least in part on a velocity at which the device is being moved over the medium.

12. The device of claim 7, wherein a value of the scaling factor is based at least in part on an acceleration of the device as the device is being moved over the medium.

13. The device of claim 7, further comprising:
a communication interface configured to receive an image from an image source; and
a print module configured to cause a printing substance to be deposited on the medium based at least in part on (i) the image and (ii) a path of travel of the device over the medium as detected in relation to the reference.

14. The device of claim 7, wherein:
the first measurement of the path of the device over the medium is based on an actual path of travel of the device; and
the second measurement of the path of the device over the medium is based on a path of travel of the device over the medium as detected in relation to the reference.

15. The device of claim 7, wherein the reference comprises a reference location on the medium.

16. A non-transitory machine-accessible medium having associated instructions, which, when executed, results in a device:
in response to moving the device over a medium
performing a first measurement of a path of the device over the medium,
obtaining a measurement of the device relative to a reference, and
based on the measurement of the device relative to the reference, performing a second measurement of the path of the device over the medium;
performing a comparison of (i) the first measurement of the path of the device over the medium to (ii) the second measurement of the path of the device over the medium;
based upon the comparison, generating a scaling factor, wherein the scaling factor is based at least in part on a difference between (i) the first measurement of the path of the device over the medium and (ii) the second measurement of the path of the device over the medium; and
creating a lookup table including the scaling factor, wherein the scaling factor in the lookup table is usable by the device to adjust a subsequent measurement of the device relative to the reference.

17. The non-transitory machine-accessible medium of claim 16, wherein a value of the scaling factor is generated based at least in part on a velocity at which the device is being moved over the medium.

18. The non-transitory machine-accessible medium of claim 16, wherein a value of the scaling factor is generated based at least in part on an acceleration of the device as the device is being moved over the medium.

19. The non-transitory machine-accessible medium of claim 16, wherein the instructions, when executed, further result in the device using a cerebellar model articulation controller (CMAC) neural network to adjust the scaling factor.

20. The non-transitory machine-accessible medium of claim 16, wherein:
the first measurement of the path of the device over the medium is based on an actual path of travel of the device; and
the second measurement of the path of the device over the medium is based on a path of travel of the device over the medium as detected in relation to the reference.

21. The non-transitory machine-accessible medium of claim 16, wherein the reference comprises a reference location on the medium.

* * * * *